United States Patent
Dahl et al.

(10) Patent No.: US 8,305,843 B2
(45) Date of Patent: *Nov. 6, 2012

(54) CHANNEL IMPULSE RESPONSE ESTIMATION

(75) Inventors: Tobias Dahl, Oslo (NO); Gudbrand Eggen, Oslo (NO)

(73) Assignee: Elliptic Laboratories AS, Oslo (NO)

(*) Notice: Subject to any disclaimer, the term of this patent is extended or adjusted under 35 U.S.C. 154(b) by 0 days.

This patent is subject to a terminal disclaimer.

(21) Appl. No.: 13/282,382

(22) Filed: Oct. 26, 2011

(65) Prior Publication Data

US 2012/0099403 A1 Apr. 26, 2012

Related U.S. Application Data

(63) Continuation of application No. 12/848,930, filed on Aug. 2, 2010, now Pat. No. 8,072,842, which is a continuation of application No. 11/766,651, filed on Jun. 21, 2007, now Pat. No. 7,768,876, which is a continuation of application No. PCT/GB2005/004968, filed on Dec. 21, 2005.

(60) Provisional application No. 60/637,437, filed on Dec. 21, 2004.

(51) Int. Cl.
*G01S 15/06* (2006.01)
*G06F 3/043* (2006.01)

(52) U.S. Cl. .......................................................... 367/96

(58) Field of Classification Search ................... 367/96; 178/18.04; 345/177
See application file for complete search history.

(56) References Cited

U.S. PATENT DOCUMENTS

| 4,506,354 | A | * | 3/1985 | Hansen | 178/18.04 |
|---|---|---|---|---|---|
| 5,059,959 | A | * | 10/1991 | Barry | 345/168 |
| 6,130,663 | A | * | 10/2000 | Null | 178/18.04 |
| 6,313,825 | B1 | * | 11/2001 | Gilbert | 345/156 |
| 6,799,141 | B1 | * | 9/2004 | Stoustrup et al. | 345/158 |
| 6,950,534 | B2 | * | 9/2005 | Cohen et al. | 382/103 |
| 7,002,876 | B2 | * | 2/2006 | Komai et al. | 367/99 |
| 7,460,690 | B2 | * | 12/2008 | Cohen et al. | 382/103 |
| 7,668,340 | B2 | * | 2/2010 | Cohen et al. | 382/103 |
| 7,768,876 | B2 | * | 8/2010 | Dahl et al. | 367/135 |
| 2004/0161132 | A1 | * | 8/2004 | Cohen et al. | 382/103 |
| 2005/0018539 | A1 | * | 1/2005 | Komai et al. | 367/99 |
| 2006/0013440 | A1 | * | 1/2006 | Cohen et al. | 382/103 |
| 2007/0085828 | A1 | * | 4/2007 | Schroeder et al. | 345/158 |

(Continued)

FOREIGN PATENT DOCUMENTS

JP H04-100381 4/1992

(Continued)

OTHER PUBLICATIONS

Biwas et al., "Channel Estimation Techniques With Long Training Sequence for IEEE 802.11A", SPCOM International Conference, pp. 136-139, Bangalore, India, Dec. 2004.

(Continued)

*Primary Examiner* — Daniel Pihulic

(74) *Attorney, Agent, or Firm* — Knobbe Martens Olson & Bear LLP

(57) ABSTRACT

A human-machine interface system adapted to track movement of an object in air is disclosed. In one aspect, the human-machine interface includes an acoustic transmitter, an acoustic receiver, and logic configured to apply a calculated inverse matrix of an impulse signal transmitted by the acoustic transmitter to a signal received by the acoustic receiver, wherein movement of the object is used to control the machine.

21 Claims, 4 Drawing Sheets

U.S. PATENT DOCUMENTS

| | | | | |
|---|---|---|---|---|
| 2008/0281523 A1* | 11/2008 | Dahl et al. | ............................ | 702/5 |
| 2009/0074248 A1* | 3/2009 | Cohen et al. | ..................... | 382/103 |
| 2010/0296368 A1* | 11/2010 | Dahl et al. | ....................... | 367/135 |
| 2011/0148798 A1* | 6/2011 | Dahl | ................................ | 345/173 |
| 2012/0001875 A1* | 1/2012 | Li et al. | ............................ | 345/177 |
| 2012/0099403 A1* | 4/2012 | Dahl et al. | ....................... | 367/135 |

FOREIGN PATENT DOCUMENTS

| | | |
|---|---|---|
| JP | 2002-008004 | 1/2002 |
| WO | WO 00/39656 | 7/2000 |
| WO | WO 01/78052 | 10/2001 |
| WO | WO 02/063601 | 8/2002 |
| WO | WO 2006/067436 | 6/2006 |

OTHER PUBLICATIONS

Garcia et al., "Frequency Domain Channel Estimation in MIMO-QFDM", Eusipco, pp. 1869-1872, Vienna, Austria, Sep. 2004.

International Search Report for corresponding Application No. PCT/GB2005/004968 dated Mar. 24, 2006.

Klahold et al., "Continuous Sonar Sensing for Mobile Mini-Robots", 2002 IEEE International Conference, pp. 323-328, May 2002.

Larsson et al., "Space-Time Block Coding for Wireless Communications", pp. 87-91, 101-107, 157185, May 2003.

"Ultrasonic Cursor Position Detection", IBM Technical Disclosure Bulletin, vol. 27, No. 11, Apr. 1985.

Written Opinion for corresponding Application No. PCT/GB2005/004968 dated Mar. 24, 2006.

Zia et al., "Channel Identification and Tracking Using Alternating Projections", 2003 IEEE Workshop, pp. 430-433, St. Louis, MO, Sep. 2003.

Office Action dated Aug. 12, 2009 from U.S. Appl. No. 11/766,651, filed Jun. 21, 2007.

* cited by examiner

CHANNEL IMPULSE RESPONSE ESTIMATION

CROSS REFERENCE TO RELATED APPLICATIONS

This application is a continuation of U.S. application Ser. No. 12/848,930, entitled "CHANNEL IMPULSE RESPONSE ESTIMATION" and filed Aug. 2, 2010, now U.S. Pat. No. 8,072,842, which is a continuation of U.S. application Ser. No. 11/766,651, filed Jun. 21, 2007, now U.S. Pat. No. 7,768,876, which is a continuation of PCT International Application Number PCT/GB2005/004968, filed on Dec. 21, 2005, which claims priority under 35 U.S.C. §119(e) to U.S. provisional patent application 60/637,437, filed on Dec. 21, 2004. Each of the above-described applications is hereby incorporated by reference in its entirety.

BACKGROUND

1. Field of the Invention

This invention relates to the estimation of the response of a channel to an impulse to allow mapping of that environment or one or more objects therein; particularly but not exclusively using acoustic impulses. It relates in particular to measuring real time changes in the environment.

2. Description of Related Technology

There are many diverse applications in which it is desirable to be able to use acoustic signals to gain information about an environment. Examples include people tracing, human-computer interfaces, seabed mapping, medical ultrasound imaging, acoustic scanners, security devices and robot vision. Using acoustic signals rather than light can have several advantages—for example it is insensitive to light conditions, works well with frequencies undetectable by humans and can offer improved or simplified depth perception.

The basic principle of acoustic mapping is that a short burst or impulse is emitted into the environment and the reflection from an object of interest in the environment is measured to determine something about it, usually its size, shape or position. This is known in the art as estimating the impulse response of the channel or simply estimating the channel. The main obstacle encountered in channel estimation for acoustic monitoring is that of unwanted echoes which arise in virtually all realistic applications. If the channel and observer are both static this is not a serious problem. However if there is any element of time variation in the system, it is necessary to transmit impulses repeatedly in order to measure the changes. A problem occurs when there is interference between a transmitted pulse and echoes from previous pulses. This problem is demonstrated with reference to FIGS. 1a to 1d.

FIG. 1a shows an impulse is driven through an output device (e.g. a loudspeaker or transducer), and the resulting signal received through an input device (e.g. a microphone, a sensor). The impulse response is shown as a time series, where the horizontal axis is the time axis and the vertical axis shows the response (e.g. the pressure) at the given time. The estimated impulse response can give important information about the channel and hence the surroundings; the position of an object ("the reflector"); deformities and shapes. Estimation of the impulse response is the basis of a vast range of signal processing applications, ranging from wireless communication through medical imaging and seismic explorations.

However there are many situations in which the surroundings could change, or the channel vary in another way. It is desirable to be able to monitor this change. Clearly to give the best temporal resolution one would need to measure the impulse response as frequently as possible. It might appear that an obvious way to do this would be to transmit impulses more often, as shown in FIG. 1(b); but this gives rise to a problem. When an impulse is sent shortly after a previous one, echoes from the first impulse response 'colour' the next estimate, as can be seen from the wavy patterns in FIG. 1(b) between the main peaks. Each estimate of the channel is therefore distorted to some extent by the last estimate. Although this is a kind of noise in that it masks the wanted signal, it is not like random environmental noise which could be overcome by increasing the signal strength or by averaging over successive estimates. Instead it is "structured" noise as it is derived from the signal itself and cannot be corrected for without knowing the channel perfectly which is of course the original objective.

The severity of this problem increases when the output impulses are emitted even more frequently, as shown in FIG. 1(c). Looking at a single "impulse response slice" (see FIG. 1(d)) from the waveform of FIG. 1(c) and comparing it to the corresponding response from FIG. 1(a) when just one impulse was transmitted, it will be seen that even though in this example the physical channel has not changed, the attempt at frequent estimation of the channel has failed; the estimate measured is dramatically different and so would give a highly inaccurate result.

The example above highlights a dilemma in channel estimation. In order to estimate a channel accurately (and hence, find the position of e.g. a strong reflector) it is necessary to use a "send-receive-wait" method. In other words it is necessary to: send a transmit signal; receive the returning signal; and wait unit all echoes have died out before transmitting again. This avoids the estimation being ruined by the structured noise arising from lingering echoes from earlier impulses. However though this severely limits the temporal resolution which is achievable and therefore the temporal tracking capabilities of many schemes (such as seabed mapping equipment or finger positioning apparatus/computer-human interfaces).

What is needed is a way of continuously, or continually and frequently, obtaining accurate estimates of the impulse response of a channel; or alternatively, monitoring or tracking the impulse response.

A previous proposal for continuously estimating a channel has been made by Klahold & al in "Continuous Sonar Sensing for Mobile Mini-robots" (Proceedings of the IEEE International Conference on Robotics and Information (ICRA0"), pp. 323-328, 2002). However, these methods are based on so-called cross-correlation techniques. As a result they have significant shortcomings. In particular, whilst such methods can be used with sliding windows of the transmitted and received signals to continually update the estimate of the channel's impulse response, it can be shown that as well as being heavily dependent on using a long enough window, the optimum performance of these techniques relies on perfect piecewise orthogonality of input signals. In other words each sample of the transmitted signal must be orthogonal with every other sample. This is very hard to achieve—especially when it is considered that in a sliding window the signal is simply incrementally shifted along so that each element of the input sample code must be orthogonal with the corresponding element of the same code a window-length away. Schemes relying on cross-correlation are dominated by this need to find sequences which fulfill the requirement for orthogonality as adequately as possible. Some examples of attempts at such codes are given by chaos coding, Gold Sequences and Golan codes. However none of these has produced satisfactory results.

SUMMARY OF CERTAIN INVENTIVE ASPECTS

When viewed from a first aspect the present invention provides a method of estimating the impulse response of a channel comprising transmitting an impulse signal to said channel, detecting a received signal from the channels and calculating an estimate of the impulse response of the channel by applying a calculated inverse matrix of the impulse signal to the received signal.

The invention extends to an apparatus for estimating a channel response comprising transmission means, receiving means and processing means wherein said processing means is arranged to apply a calculated inverse matrix of an impulse signal transmitted by the transmission means to a signal received by the receiving means.

The invention also extends to: a computer software product for estimating the impulse response of a channel comprising means for applying a calculated inverse matrix of a matrix representing a transmitted signal to a plurality of samples of a received response signal; and to a carrier bearing such software.

Thus in accordance with the invention a calculated inverse matrix of the transmitted impulse signal is applied to the received signal. It can be shown that this gives a reliable estimate of the channel without requiring successively orthogonal codes and without having to resort to the crude send-receive-wait technique. Furthermore since the inverse matrix is based on the transmitted signal, even though it may be computationally demanding, it need not be calculated in real-time since the transmitted signal, and hence the calculated inverse matrix, can be predetermined.

DETAILED DESCRIPTION OF CERTAIN EMBODIMENTS

Figure 1A:
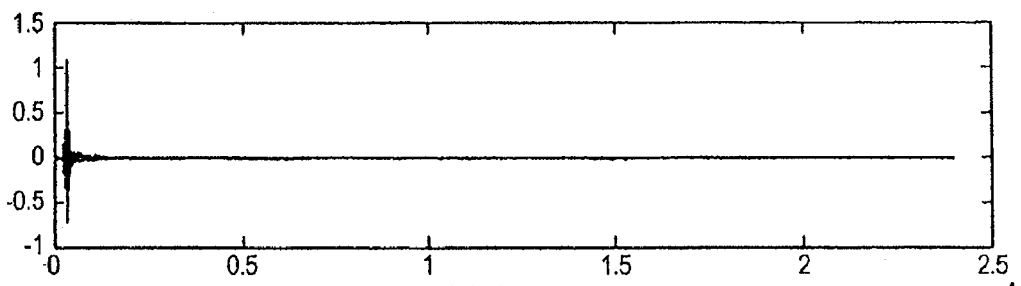
FIGS. 1a-1c show signal traces from signal impulses received at different frequencies.
Figure 1B:
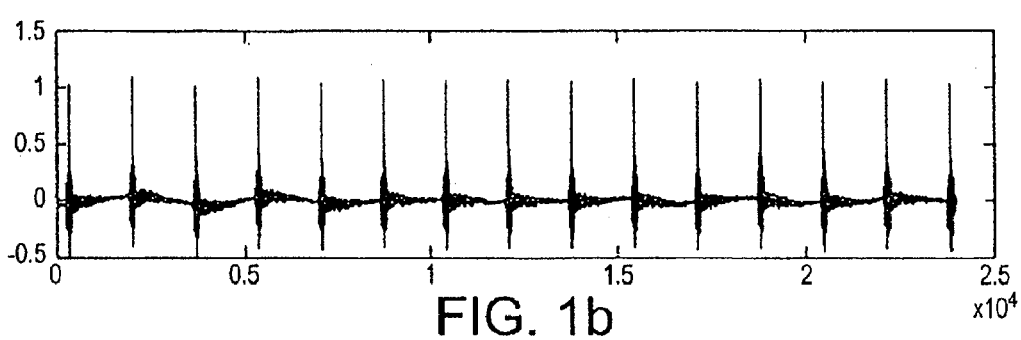
Figure 1C:
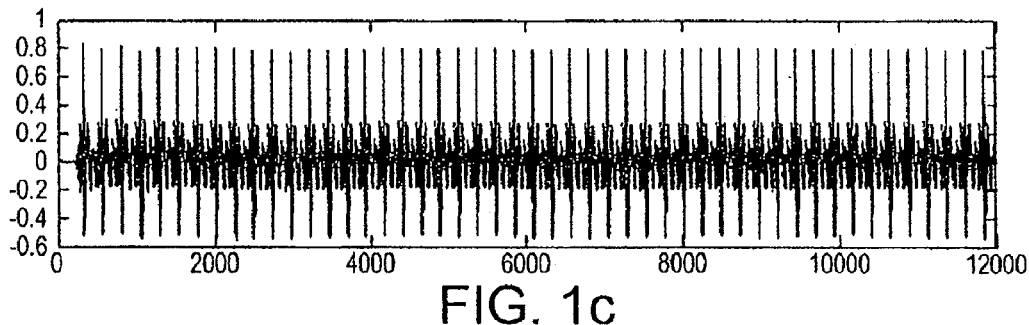
Figure 1D:
FIGS. 1d and 1e show magnified signal traces of single impulses from the traces shown in FIGS. 1a and 1c, respectively.
Figure 1E:

As used herein the term "calculated inverse matrix" is to be understood to mean a generalised inverse matrix which is calculated, using an appropriate matrix inversion technique, from a matrix representing or characteristic of the output signal. It will be clear to those skilled in the art that this is very different to an inverse of the signal itself.

There are a large number of possible appropriate methods for calculating such a matrix which result in correspondingly different calculated inverse matrices. Suitable possible methods of calculating inverse matrices include: ridge regression; partial least squares (PLS), conjugate gradient (CG) based methods; information theoretical methods, such as those based on the maximum entropy (MAXENT) principle; regression based on other norms and criteria such as the $L^p$ norm; maximum likelihood regression; and regression based on variable subset selection. In addition, the use of the regression model to emulate classification or clustering-like properties, for the purpose of segregating different qualities of the signal parameters into different classes, such as discriminant analysis, optimal scoring, (generalized) canonical correlation analysis, local regression methods, functional analysis regression and kernel methods are envisaged within the scope of the invention. Further details regarding these methods are given in "Elements of statistical learning" by T. Hastie, R. Tibshirani and J. Friedman, the Springer Series in Statistics, 1001, Springer Verlag.

In preferred embodiments however the calculated inverse matrix is the pseudo-inverse matrix, or Moore-Penrose inverse matrix. As is known in the art, this is the unique minimum-norm least squares solution to the associated linear equation.

The invention can be used with a single impulse signal burst. Preferably however the impulse signal is persistent i.e. the impulse signal could be transmitted continuously, at regular intervals, spasmodically or in another other continuing mode. This allows of course the monitoring of variation of the channel's impulse response with time without the restriction of the send-receive-wait paradigm and so is where the invention delivers greatest benefit.

The invention may be used to estimate the impulse response of any channel to any sort of impulse. In particular the impulse could comprise electromagnetic waves from any part of the spectrum, e.g.: microwaves; visible, ultraviolet or infrared light; radio waves; X rays etc. At present the Applicants see particular benefit in the estimation of response to acoustic impulses such as can be used in the applications mentioned in the introduction. Thus in some preferred embodiments the transmitted impulse comprises an acoustic impulse. Within this set of embodiments, the frequency band used will depend on the application. For example one important application envisaged is the tracking of an object in air over distances of the order of less than a metre (e.g. for a computer-human interface). For this and similar applications ultrasonic signals are suitable. Thus in one set of preferred embodiments the invention the impulse is ultrasonic; preferably the centre of the bandwidth of the signal is greater than 20 kHz, more preferably greater than 30 kHz and most preferably between 30 and 50 kHz.

Another application envisaged is in seismic imaging. Here the impulse is likely to have a broad bandwidth that could extend down to the order of Hertz.

The ability of the calculated inverse matrix to give a good approximation to the channel being measured will now be demonstrated using the example of the preferred pseudo-inverse matrix.

It may first be assumed that the transmission of a signal over a channel follows the following model;

$$y(t)=h(t)*x(t)+n(t) \qquad \text{Eq (1)}$$

where:
x(t) is the signal transmitted
y(t) is the received signal
h(t) is the channel's impulse response
n(t) is an environmental noise term
* denotes a convolution operator The transmitted signal is represented as a time series—that is to say a series of discrete signal values at regular time intervals. The received signal is also represented as a time series since it will be a sampled signal. The impulse response h(t) is what is being sought to be measured. It is assumed that the channel h(t) is constant or changing very slowly relative to the changes in x(t) and y(t), at least within any actual time-window used. That is not to say that time-varying channels cannot be measured, indeed that is the object of the invention, just that the channel variation should be slow compared with the signal variation.

The channel can be represented as a Q-tap finite impulse response (FIR) filter. As is well known in the art this is a construction in which the channel h(t) is seen as a series of weights to be applied to the previous Q time samples of the input signal. Eq (1) can therefore be rewritten as follows:

$$y(t) = h(t) * x(t) + n(t) = \sum_{i=0}^{Q-1} x(t-i)h(i) + n(t) \qquad \text{Eq (2)}$$

Figure 2:
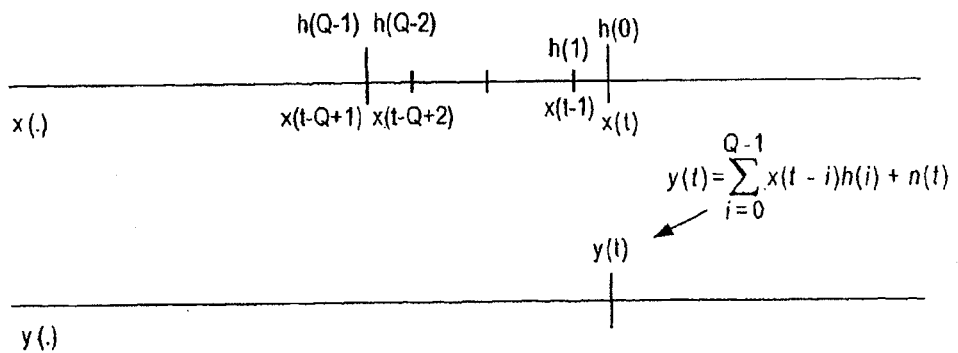
FIG. 2 shows a mathematical model of the channel.

An interpretation of the model is as follows. At a given time t, the Q last time-samples of x(t−Q+1), ... x(t), are linearly combined according to the weights given in h(0) ... h(Q−1) to give the current input signal y(t). The model is illustrated in FIG. 2. To simplify the calculations, there is, for the time being, assumed to be no environmental noise, i.e. n(t)=0 for all t. The issue of noise is addressed further below.

Figure 3:
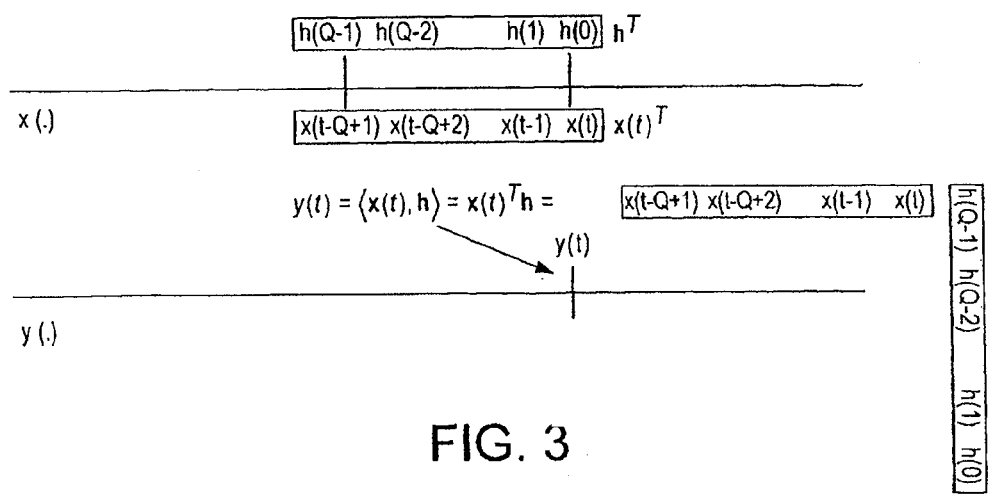
FIG. 3 shows a mathematical model of the channel from a vector-space/inner-product point of view.

The process could also be seen from a vector-space/inner-product point of view. A "snapshot" of the Q−1 latest realizations of the process x(t) is put into a vector x(t), and its inner product with the vector h containing filter coefficients h(0), ... h(Q−1) taken as the result y(t), as illustrated in FIG. 3.

Figure 4:
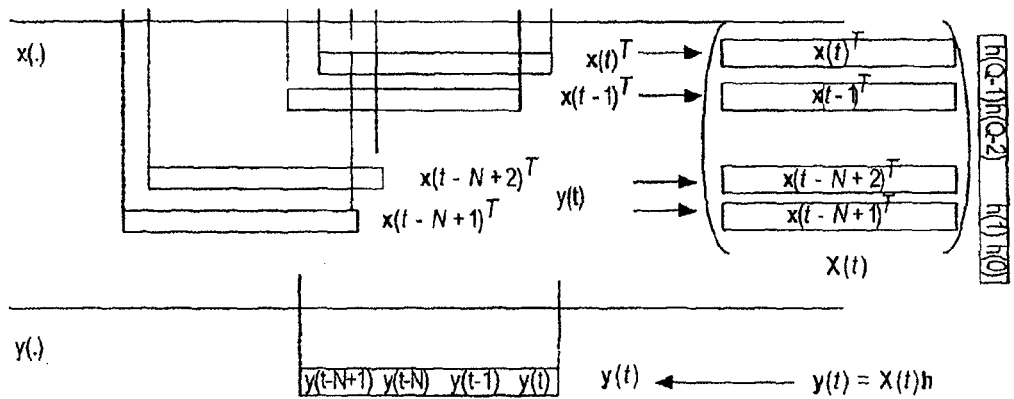
FIG. 4 shows a mathematical model of the channel with a series of snapshot vectors.

What is required is an estimate of the vector h. This vector cannot be estimated unambiguously from a single observation y(t) of the input signal and one vector x(t) alone. To get sufficient information about h for unambiguous information, what is required is a series of "snapshot-vectors" x(t), x(t−1), ... from the x(t)-process, and one snapshot-vector y(t)=[y(t−N+1), ... y(t)] of the y(t)-process. Then, the response-snapshot-vector y(t) can be written via an inner product of h with each of the "snapshot-vectors" x(t), x(t−1), ... as illustrated in FIG. 4.

A final version of the matrix set-up can be seen by noting that the elements of X(t) can be written as:

$$X(t)_{ij} = x(t-i-j) \quad 0 \leq j \leq Q-1,\ 0 \leq i \leq N-1 \qquad \text{Eq (3)}$$

Figure 5:
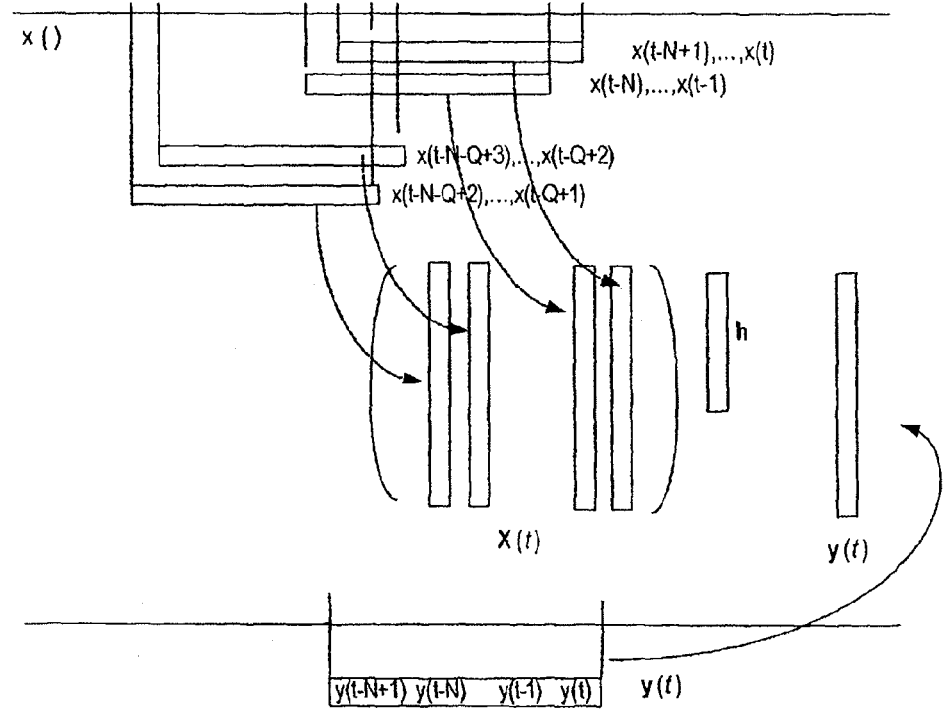
FIG. 5 shows a matrix with successive time slices.

It can now be seen that the first column of X(t) contains the time-slice of x(t) from x(t−Q+1) to x(t−Q−N+2), going backwards in time from top to bottom. The second column of X(t) contains the time-slice of x(t) from x(t−Q+2) to x(t−Q−N+3), etc, and the final column contains the time-slice of x(t) going from x(t−N+1) going backwards in time. In summary, the columns of the matrix X(t) contains successive time slices of x(t), as illustrated in FIG. 5.

It can now be seen that the output signal vector y(t) is a linear combination of the last Q time-snapshot vectors of x(t). This is a vectorized version of the original statement of the model.

As long as the matrix X(t) is sufficiently well conditioned, the impulse response h can be estimated in a number of different ways, by picking an estimate ĥ in accordance with a suitable criterion, such as $$\hat{h} = \operatorname{minarg}_h \|X(t)h - y\|_2^2 \qquad \text{Eqs (4)}$$
$$\hat{h} = \operatorname{minarg}_h \|X(t)h - y\|_2^2 + \alpha\|h\|_2^2$$

Where α is a regularization parameter used to shrink the solution candidate in the presence of noise and/or co-linearity in the predicting variables.

The solutions to equations 4 and 5 above are the well known ordinary least-squares (OLS) estimates and ridge or least mean squares (LMS) estimates, $$\hat{h}_{LS} = X(t)^+ y$$
$$\hat{h}_{LMS} = (X(t)^T X(t) + \alpha I)^+ X(t)^T y \qquad \text{Eqs (5)}$$

Where the "+" operator denotes the Moore-Penrose inverse matrix. This is known in the art and simplistically it is the best approximation, using a least squares approach, to the solution for a set of linear equations. Where a plurality of solutions exist, the minimum L2 norm one is chosen.

If the noise level is known, the α parameter could be chosen to minimize the statistical mean square error. This technique is known as the LMS method in the art of signal processing. In such cases, however, it is normally assumed that the matrix X(t) contains all of the samples received from a single driving signal or compressed pulse. In accordance with the present invention however it is proposed to use an X(t) matrix which contains only a subset of the driving signals. This allows the estimates of h to be, updated over time, without having to wait for a signal to die out before transmitting first. This effectively gives a sliding sample window.

The above-mentioned sliding-window formulation of an LMS method is essentially a continuous LMS method as opposed to one using just a single pulse or pulses spaced to avoid overlap. This is not to be confused with time-continuous LMS methods which simply refers to having a time-continuous (i.e. analogue) representation of the signals rather than having discrete samples.

It can be seen from the foregoing analysis that applying a calculated inverse matrix, such as the pseudo-inverse matrix, of the transmitted signal to the received signal gives a good estimate of the acoustic channel without requiring mutual orthogonality throughout the transmitted signal. In fact the important factor in determining performance is the extent to which respective portions of the transmission signal are linearly independent of one another. This is much less stringent that mutual orthogonality. The importance of linear independence arises from equations Eqs (5) in which having the portions of the signal as linearly independent as possible minimises ambiguities in the channel estimation. Such ambiguities would reduce the conditioning quality of the matrix X(t), leading to more possible solutions to the preceding equations, Eqs (4). Furthermore, the variance in the estimates of h would increase, since a co-linearity in the columns of X(t) implies that X(t) has some small singular values, which in turn, upon pseudo-inversion for example, has the effect of blowing up additive noise components.

As is shown later on, the inversion technique of the invention suffers dramatically less from the problem of structured noise which has been described. The reason for this is that because this structured noise forms part of the received signal, it will have the calculated inverse matrix applied to it. This can be shown to have the effect of randomising or whitening the structured noise thus making it easy to average away.

It is a significant consideration that the calculation of inverse matrices such as pseudo-inverses matrices is a computationally intensive task. The required inverse matrix could be computed at the same time or immediately prior to applying it to the received signal. In simple applications it might be possible to do this in real time as the impulse signal is transmitted. However this will limit the resolution (both temporal and spatial) which can be achieved. To counter this the channel estimation could be carried out as ex post facto analysis. However this would make it unsuitable for many applications.

Preferably though the inverse matrix is calculated prior to transmitting the impulse signal. The Applicant has appreciated that the ability to do this it is an important advantage of preferred methods in accordance with the invention. This allows real-time implementation without the drastic limits on resolution or expensive processing power requirements. The calculated inverse matrices; e.g. $X(t)^+$ can be computed in advance from the predetermined signal x(t) and stored in memory, then used as a look-up table for pre-multiplication with snapshot vectors of samples in y(t). There is no need for real-time inversion. The significance of this benefit can be better appreciated by comparing it to recent prior art teaching in US2005/0018539A1 in which a model is constructed such that it is necessary to invert a matrix built up from time-samples of the response signal y(t), in which case post measurement inversion is inevitable. The emphasis of the teaching therein is therefore directed to ways of dividing the processing necessary between a number of computers over distributed network. By contrast an embodiment of the present invention has been successfully implemented on a standard desktop personal computer as will be described later.

The received signal is normally the result of a reflection from the surfaces of objects in the environment and the effect of the medium in which the signal is travelling (e.g. air far acoustic signals). Equally however the received signal could have passed through part of an environment without reflection. This could be the case for example with a simple system for positioning a transmitter (or an object to which it is attached) in space.

The transmitted signal, and therefore the received response, could be broadband signals within the constraints of the hardware employed. In at least some preferred embodiments however they are deliberately limited in bandwidth. This is advantageous as it reduces the amount of computation required to calculate the channel estimate since limiting the bandwidth of an otherwise broadband signal corresponds to introducing redundancy into the signal.

To take an example, the bandwidth might be limited to a third of its original range. Subsequent time-samples in the transmitted impulse x(t) and the received signal, y(t) will exhibit a degree of redundancy if the vector elements extracted from the full vector are chosen so as not to cause aliasing effects, since only approximately a third of the number of multiplications in the inner products that would otherwise be needed is sufficient to obtain close correlation with the full inner products contained in the matrix operations.

Furthermore, when the transmitted and received signals x(t) and y(t) are band-limited, so will the channel estimate $\hat{h}$ be. It is then sufficient to estimate a reduced number of taps in $\hat{h}$ (again if the filter taps in $\hat{h}$ are chosen so as to avoid aliasing) to be able to predict the other taps with sufficient prediction quality for a number of applications. This again reduces the amount of computation required and so broadens the possible applications and/or increases the speed at which the analysis can be carried out, which in turn allows a greater temporal resolution to be achieved. Preferably the samples are chosen randomly or according to a pseudo-random sequence—since a regularly spaced selection would be equivalent simply to reducing the sampling rate.

In one set of preferred embodiments the channel estimation is used to monitor all of the features of an environment. For example it could be used to measure the surface of a sea-bed which is of great value for oil exploration. Here the 'channel' is the sea bed and intervening water. The advantage which can be achieved in accordance with the invention is that the surface may be scanned far more rapidly than with prior art techniques whilst maintaining adequate resolution. This is a result of the ability given by the invention to provide a continuous update of the channel estimate without having to wait for sent signals to die out and without having to construct transmission codes which are as highly mutually orthogonal as possible. Other examples of such embodiments are in medical imaging, security scanning, robotic vision etc.

When viewed from a further aspect the invention provides a method of mapping an environment comprising transmitting an impulse signal into the environment, detecting a return signal from the environment and applying a calculated inverse matrix of the impulse signal to the return signal.

Also provided is a mapping apparatus for mapping an environment comprising means for transmitting an impulse signal into the environment, means for detecting a return signal from the environment and applying a calculated inverse matrix of the impulse signal to the return signal.

The invention extends to a computer software product for mapping an environment comprising means for applying a calculated inverse matrix of an impulse signal transmitted into the environment to a return signal from the environment; and means for calculating therefrom a representation of the environment.

Preferably said mapping method comprises constructing a position diagram based on the estimated channel response. This is a representation in which successive impulse response estimates are presented adjacent one another. Features of such diagrams such as the edges or centre of a reflector can then be identified using standard image processing techniques. For example by moving the transmitter at a constant speed over a terrain such as sea-bed, the profile of the sea-bed will be scanned.

In another set of preferred embodiments the channel estimation is used to track a moving object. Here the 'channel' is the object and surrounding space. The ability to update the channel estimate continuously is critical here. Such applications were simply not possible with prior art send-receive-wait techniques unless the object was moving very slowly or a very low spatial resolution was sufficient. As will be seen in the example below, an embodiment of the invention has been shown to be able to track rapid movements of a fingertip to sub-millimetre accuracy using a standard desktop PC, an ordinary PC loudspeaker and two ordinary microphones. This has many possible applications in human-machine interfaces that obviate the need for physical contact. One particular such application which is envisaged by the applicant is in an interface for medical equipment, particularly in hospitals in which avoiding the need for physical contact reduces the risk of cross-infection via the equipment.

When viewed from a yet further aspect the invention provides a method of tracking an object comprising transmitting an impulse signal, recording a reflection of said impulse signal from said object and applying a calculated inverse matrix of the impulse signal to said reflected signal.

Preferably said method also comprises constructing a position diagram based on the estimated channel response and interpreting the said position diagrams, e.g. using suitable image processing techniques in order to calculate the position of the object being tracked.

Also provided is a tracking apparatus comprising transmission means, receiving means and processing means wherein said processing means is arranged to apply a calculated inverse matrix of an impulse signal transmitted by the transmission means to a signal received by the receiving means.

The invention extends to a computer software product for tracking an object comprising means for applying a calculated inverse matrix of an impulse signal transmitted towards the object into the environment to a return signal reflected from the object; and means for calculating therefrom the location of the object.

In general each pairing of a transmitter and receiver allows tracking in one dimension. Hence for two dimensional tracking two receivers or, preferably, two transmitters are required. A common transmitter or receiver respectively can be used in these two cases. However this is not essential and separate ones could be used instead. The two transmitters could be driven by independent signals. Alternatively they could be driven by the same signal except for a time delay being applied to one with respect to the other. This allows the signals to be distinguished from one another. The same effect can be achieved by physically offsetting one of the transmitters from the tacking region.

In some envisaged embodiments two transmitters, e.g. loudspeakers, are driven by respective signals from the same frequency band, the signals being separated at the receiver. This can be seen below:

The signal received at the receiver (e.g. microphone) is a combination of the signals transmitted (and convolved):

$$y(t) = h_1(t)*x_1(t) + h_2(t)*x_2(t) \qquad \text{Eq (6a)}$$

or in matrix/vector notation:

$$y(t) = X_1(t)h_1(t) + X_2(t)h_2(t) \qquad \text{Eqs (6b)}$$

$$y(t) = [\,X_1(t)\ \ X_2(t)\,]\begin{pmatrix} h_1(t) \\ h_2(t) \end{pmatrix} = X(t)h(t)$$

where $$X(t) = [\,X_1(t)\ \ X_2(t)\,] \text{ and}$$

$$h(t) = [\,h_1(t)^\wedge T\ \ h_2(t)^\wedge T\,]^\wedge T.$$

Using a method in accordance with the invention, the vector h(t), containing both of the impulse responses $h_1(t)$ and $h_2(t)$, can be estimated, ensuring that the dimensions of the matrix X(t) are chosen such that the result is stable with respect to errors and perturbations.

Of course for three-dimensional tracking an extra transmitter or receiver can be added. The method of the invention is ideally suited to being used with multiple transmitters and receivers as can be appreciated from the analysis. For example these multiple elements might be used to in order to perform array processing and array image generation and analysis. Indeed the method of the invention is powerful in the range of applications and sound and image generation techniques with which it can be used. This stems from the ability to carry out the computationally intensive calculations which result from inverting the signal matrix in advance of actual operation.

To locate an object on two or three dimensions the different signals must be suitably combined. Preferably ellipse intersection is used to combine the impulse response estimates corresponding to the different signals to locate the object being tracked. In other words by interpreting a peak in the impulse response as due to a strong reflector, the reflector is taken to lie on an ellipsoid having the receiver/transmitter as focal points, and a radius given by the propagation time from the transmitter to the reflector and back. If multiple transmitters/receivers are used, the reflector lies on the intersection of the ellipsoids corresponding to the receiver-transmitter-propagation time triploids, and can be identified as the common intersection point of these ellipsoids.

The mapping and tracking uses of the invention set out above have an important feature in common: namely that they are closed in the sense that the receiver receives and analyses only the response of the channel to the impulse the transmitter generates. Indeed this is true in general in accordance with the invention; no information is communicated between the transmitter and receiver. The invention is predicated on the receiver knowing exactly what will be transmitted, albeit that this is transformed into the calculated inverse matrix. Logically no information can be passed since the 'information' would be needed to calculate the inverse matrix.

Preferably the sampling rate employed for the transmitted signal and received response is the same. However this is not essential—they could be different. Depending on the application and the resolution required sampling rates of anything from a few Hertz up to Gigahertz could be used.

The Applicant has appreciated that the continuous LMS method set forth in accordance with the invention is advantageous as it robust against lingering echoes and noise. This will be demonstrated below. Including both lingering echoes and noise in Eq (1) gives:

$$y(t) = h(t)*x(t) + n(t) = \sum_{i=0}^{Q-1} x(t-i)h(i) + n(t) + s(t) \qquad \text{Eq (7)}$$

Where n(t) is the channel noise, and s(t) is the contribution from a lingering echo. This echo will clearly be a filtered version of some earlier part of the signal x(t). In other words contributions to s(t) must come from earlier samples of x(t) than the ones contained in the vector [x(t−Q+1), . . . x(t)] which was discussed in the foregoing analysis. These earlier samples will be convolved with further filter taps corresponding to obstacles or effects which are outside the taps that are held in the vector h. These further taps are represented by the filter g(t) so that:

$$s(t) = \Sigma_{k=Q}^{M} g(k-Q)x(t-k) \qquad \text{Eq (8)}$$

Where M is the maximum reverberation time (or lingering time of an echo). Moving to matrix notation, equations Eq (7) and Eq (8) can be written in block form as:

$$y(t) = X(t)h + X_2(t)g + n(t) \qquad \text{Eq (9)}$$

Here, $X_2(t)$ contains the part of the signals in the matrix form described above outside the central Q-tap-window, g is a vector with the "out-of-window" filter taps, and n(t) is a vector containing the additive channel noise.

Using the inversion technique in accordance with the invention and left-multiplying Eq (9) above with the pseudo-inverse matrix $X(t)^+$ gives:

$$X(t)^+ y(t) = X(t)^+ X(t)h + X(t)^+ X_2(t)g + X(t)^+ n(t)$$

$$= \tilde{h}(t) + X(t)^+ X_2(t)g + X(t)^+ n(t) \qquad \text{Eq (10)}$$

$$\hat{h}(t) = \tilde{h}(t) + m(t)$$

Where $m(t) = X(t)^+ X_2(t)g + X(t)^+ n(t)$

For the first term on the right hand side of the second line, if $X(t)^+ X(t) = 1$ then $\tilde{h}(t) = h$, and if not, then it is a least squares minimum-norm estimate of h (according to the definition of the Moore-Penrose inverse matrix). The second term on this line relates to the lingering echo. Although in general the lingering echo $X_2(t)g$ will be in the form of "structured" noise, the problem with which was explained in the introduction, $X(t)^+ X_2(t)g$ will not have this structure. This is because the signals of x(t) contained in X(t) and $X_2(t)$ are not dependent, and pre-multiplying the lingering echo $X_2(t)g$ with $X(t)^+$ has the effect of distorting the temporal structure in the lingering echo. Moreover, it will do so differently for different sliding matrix pairs $X(t)$ and $X_2(t)$. Hence, the lingering echo will not be a troublesome, repeating factor building up over time, but rather acts like an ordinary noise component, similar to the component n(t). Put another way, the lingering echoes are a general source of noise, but by pre-multiplying this noise, structured or not, by a time-varying random-element based matrix, i.e. the inverse matrix $X(t)^+$ any repetitive temporal structure is removed from the noise source. The consequence of this is that when the estimate $\hat{h}(t)$, which might be identical with or close to the true h, is observed and added to a time-varying error term m(t), the effect of such a noise term can be minimized by averaging $\hat{h}(t)$ over a period of time. A similar argument holds if ridge regression, is used as in Eqs (5).

It is stated hereinabove that methods and apparatus employing the invention are advantageous over using cross-correlation. This will be explained below, beginning with an explanation of how the cross-correlation referred to herein works.

Assuming a signal x(t) has been transmitted through a loudspeaker, it is received through a microphone again as y(t). The received signal y(t) is taken to relate to the transmitted one x(t) as follows:

$$y(l) = [x(t) * h(t)](l) = \sum_{k=0}^{K-1} x(l-k)h(k) \qquad \text{Eq (A)}$$

That is, a sample of y(t) is a linear combination of the K last samples of x(t) where the linear weights are given in the "filter coefficients" $h(0), \ldots h(K-1)$. To estimate the channel, it is necessary to estimate these filter coefficients. In this technique the assumption is made that the signal x(t) is, for all t from—infinity to plus infinity, "white". In other words it is assumed that the signal is uncorrelated with itself for all non-zero shifts. Expressing this in an equation:

$$[x(t) * x(-t)](l) = \sum_{k=-\infty}^{\infty} x(l-k)x(-k) \qquad \text{Eq (B)}$$

$$= \sum_{k=-\infty}^{\infty} x(l+k)x(k)$$

$$= \begin{cases} P & \text{if } l = 0 \\ 0 & \text{otherwise} \end{cases}$$

where P is a real, positive number.

Convolving a signal with its own time-reverse is the same as correlation with the signal itself, i.e. computing the auto-correlation of the signal. So assuming that x(t) is indeed white, correlating x(t) with itself yields a positive value P for a time lag of 0 and zero everywhere else. Another way of writing this is:

$$x(t)*x(-t)=P \cdot \partial(t) \qquad \text{Eq (C)}$$

where $\partial(t)$ is the Dirac delta function.

It is now assumed that Eq (B) also holds approximately around a point $t_0$ in time, with a length of N+1 samples and a time-window of x(t), so that:

$$[x(t) * x(-t)]_{t_0}(l) = \sum_{k=-N/2}^{N/2} x(l+t_0-k)x(t_0-k) \qquad \text{Eq (D)}$$

$$= \sum_{k=-N/2}^{N/2} x(l+k+t_0)x(k+t_0)$$

$$\approx \begin{cases} P & \text{if } l = 0 \\ 0 & \text{otherwise} \end{cases}$$

Convolving y(t) with x(−t) around $t_0$ gives:

$$[y(t) * x(-t)]_{t_0}(l) = \sum_{k=-N/2}^{N/2} y(l+t_0-k)x(t_0-k) \qquad \text{Eq (E)}$$

and calculating the inner term in the sum gives:

$$y(l+t_0-k) = \sum_{i=0}^{K-1} x(l+t_0-k-i)h(i) \qquad \text{Eq (F)}$$

and hence:

$$[y(t) * x(-t)]_{t_0}(l) = \sum_{k=-N/2}^{N/2} \sum_{i=0}^{K-1} x(l+t_0-k-i)h(i)x(t_0-k) \qquad \text{Eq (G)}$$

$$= \sum_{i=0}^{K-1} \left[ \sum_{k=-N/2}^{N/2} x(l+t_0-k-i)x(t_0-k) \right] h(i)$$

$$\approx P \cdot h(l)$$

As can be seen from Eq (D) above, the term in the brackets in Eq (G) is P (approximately) if and only if l=i and (approximately) 0 otherwise. Hence by choosing l=1, the outcome of the convolution $[y(t)*x(-t)]_{t_0}(l)$ will be P times h(1), if l=2, then it is P times h(2) etc. In this way, the filter coefficients h(.) can be estimated by convolving windows of x(t) with windows of l(t) around a certain "centre" time sample $t_0$. However, the approximations in Eq (D) are just approximations. In practice, it is very hard to find sequences x(t) which have the property of being continuously locally white, and for many desirable choices of N and K in the equations above, it is impossible. This limits the performance of the overall estimation quality.

The cross-correlation method set out above could be put into a similar framework to the one used to demonstrate the invention in Eq (5 and 6). In this case, the estimator would be $$\hat{h}_{Corr} = X(t)^T y$$

This is a poor estimator. In the case where X(t) is an orthogonal matrix, the solution would be identical with the LS or LMS or ridge estimators (up to a scaling constant). However, it is generally difficult to construct a time-series x(t) with the property that the related sliding window matrices X(t) are generally orthogonal. This is due to the problem of finding sequences of relatively short length which take the form of orthogonal codes. As a consequence, code sequence selection is mandatory in cross-correlation based methods, but are of much less importance in the continuous LMS method.

Figure 6:
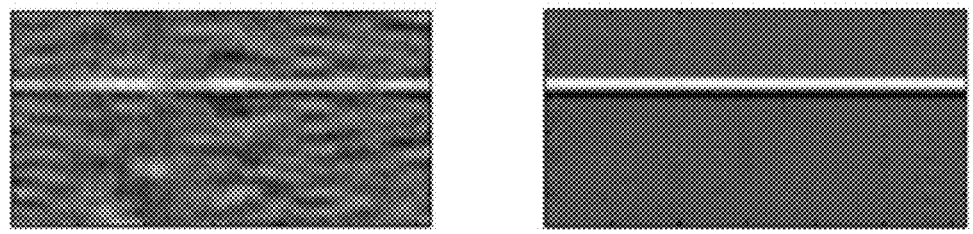
FIG. 6 shows an example of a sequence of impulse response estimates.

In FIG. 6 an example of a sequence of impulse response estimates is shown. This example is an artificial case where the impulse-response does not change but it seeks to show the relative resolution clarifies. Vertical slices of the picture correspond to impulse response estimates at successive points in time, i.e. the pictures are position diagrams as set out above. In the left panel, the results obtained using a cross-correlation method are shown; and in the right panel, a continuous LMS-method in accordance with the invention has been used. The presence of unwanted artefacts in the cross-correlation picture is apparent, and will make subsequent tracking tasks harder than with LMS.

As previously set out in at least some preferred embodiments the bandwidth is deliberately limited beyond the constraints of the hardware used. This has advantages in reducing the amount of computation required as will now be demonstrated.

In the case when signals are band-limited, there is temporal redundancy in the signals x(t), and hence, the rows and columns of the matrices X(t) will also exhibit redundancy. The effect of this is that the rank of the matrices X(t) is reduced. Although this will give reduced precision in the estimation of the true impulse response h, it will also enable further computational reductions.

Let:

$$X(t) = USV^T = \sum_{i=1}^{rank(X(t))} \sigma_i u_i v_i^T \quad \text{Eq (11)}$$

be an economised singular value decomposition of X(t), where ($\sigma_i$) are the non-zero singular values, and $\{u_i, v_i\}$ are the left and right hand side singular vectors. The matrices $U=(u_1, u_2, \ldots, u_r)$ $V=(v_1, v_2, \ldots, v_r)$ and $S=\text{diag}(\sigma_1, \sigma_2, \ldots, \sigma_r)$ contain the r=rank(X(t)) left and right singular vectors and the singular values respectively. If X(t) is highly collinear, many of the singular values will be close to zero. This allows the approximation:

$$X(t) \approx \tilde{X}_k(t) = U_k S_k V_k^T = \sum_{i=1}^{k} \sigma_i u_i v_i^T \quad \text{Eq (12)}$$

Which is the k-component approximation to X(t). The matrices $U_k, S_k, V_k$ contain only the k first singular vectors and values of this matrix. Furthermore, the pseudo-inverse matrix estimate of X(t) can now be written as:

$$X(t)^+ \approx \tilde{X}_k(t)^+ = V_k S_k^{-1} U_k^T = \sum_{i=1}^{k} \sigma^{-1} i v_i u_i^T \quad \text{Eq (13)}$$

Since the matrices $U_k, S_k, V_k$ now have a reduced number of columns and rows, T and P are written as:

$$T = V_k S_k^{-1}$$

$$P = U_k^T$$

If X(t) is an (N×Q) matrix, then X(t)$^+$ will be (Q×N), and hence T is Q×K and P is (N×K). To apply the pseudo-inverse matrix of X(t) for estimating a channel h;

$$\hat{h} = X(t)^+ y(t) \approx \tilde{X}_k(t)^+ y(t) = TPy(t) = T(Py(t))$$

Now, computing the product Py(t) requires N×K operation (multiply-and-sum operations), and computing the product of the result Py(t) with T requires Q times K operations, which means that the total number of operations is (N+Q)×K. The original method alternative would be to multiply directly with X(t)$^+$ which requires N×Q operations. In the case where N=200, Q=70, and K=Q/3~23 gives a sufficiently good reduced-rank estimate of X(t) (typical when using a signal limited to ⅓ of its original frequency band), the total number of operations multiplying y(t) with X(t)$^+$ is 200×70=14,000, where as multiplying y(t) first with P and then with T gives a total of (N+Q)×K=(200+70)*23=6210 operations, which means that more than half of the operational time has been saved. The implementation of the proposed reduction involves storing two sets of matrices T,P for each time-window rather than one (X(t)$^+$).

The foregoing gives rise to further preferred features of the invention. At least in some preferred implementations of the method of the invention, the calculated inverse matrix comprises a pair of matrices derived from a subset of a singular value decomposition of the impulse signal matrix, the method comprising the step of multiplying said matrices by a vector containing samples of said received signal. Preferably the method further comprises selecting a subset of samples of said received signal to produce a subset vector and multiplying said pair of matrices by said subset vector.

In accordance with another preferred feature the method comprises calculating a subset of rows and/or columns of said inverse matrix and interpolating between said subset to complete the calculated inverse matrix.

An example of an implementation of the invention will now be described merely for ease of understanding and should not be understood as limiting the scope of the invention.

A finger-tip tracking system was constructed using a standard PC loudspeaker driven by a sound card. Two standard PC microphones were also connected to the sound card to record the reflected signal. Of course dedicated ultrasound transducers or hydrophones could have been used instead.

A digital white noise signal in the band 0 to 20 kHz where each temporal sample is drawn from the interval [−1,1] was generated by a digital signal processor (DSP) and passed through a digital-to-analogue converter to the sound card and thus to the loudspeaker. The signals received from the microphones were routed via the sound card to an analogue to digital converter (i.e. a sampler). A sampling rate of approximately 22 kHz was used. The sampled signal was passed to the DSP. The DSP is also connected to a memory store holding the pre-calculated pseudo-inverse matrix of the transmission signal. This is then used to pre-multiply the matrices of received response samples in a window.

Typical parameters are as follows. Choosing the dimensions of the matrix X(t) to be 200×70, (estimating 70 filter taps using 200 snapshots of the x(t)-signals) and having 100 updates of the impulse responses estimates pr. second yields a total number of 200×70×100=1.4 million multiplication-and-sum operations per second, or 1.4 Megaflops. This is a modest number of operations which could be implemented in software as a background operation, or on an inexpensive DSP. The number of operations could be compressed to being integer operations. Furthermore, processor parallelism and single instruction multiple data instructions and a designated co-processor can be used for this purpose.

The resultant calculated taps are plotted on a position diagram—similar to that shown in the right panel of FIG. 6. This is effectively a plot of displacement from the transmitter/receiver (vertical axis) against time (horizontal axis). The plots in FIG. 6 therefore relate to a stationary reflector. A position diagram is plotted for each signal—i.e. for each loudspeaker.

Figure 7:
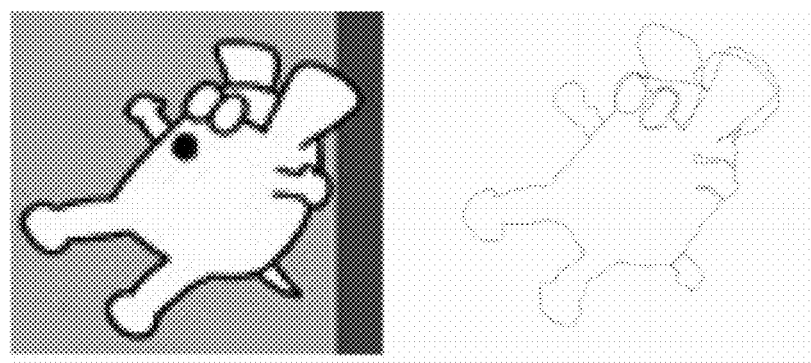
FIG. 7 shows an example of a picture from an embodiment.

In order to plot a two dimensional trace, the two diagrams are continuously combined using ellipse intersection to allow the outline of movement of the reflector to be plotted. FIG. 7 shows an example of a picture used to trace a finger around and the resulting plot obtained from the apparatus described above. It will be observed that very small movements in the reflector are clearly resolved. For example it may be seen that the plot on the right hand side is actually made up of several consecutive tracings of the outline on the left hand side.

What is claimed is:

1. A human-machine interface system adapted to track movement of an object in air wherein said human-machine interface comprises: an acoustic transmitter; an acoustic receiver; and logic configured to apply a calculated inverse matrix of an impulse signal transmitted by the acoustic transmitter to a signal received by the acoustic receiver, wherein movement of the object is used to control the machine.

2. The system as claimed in claim 1 wherein said transmitter is configured to transmit said impulse signal at regular intervals.

3. The system as claimed in claim 1 wherein said transmitter is configured to transmit said impulse signal continuously.

4. The system as claimed in claim 1 comprising logic for calculating said inverse matrix.

5. The system as claimed in claim 1, wherein the calculated inverse matrix comprises a ridge inverse matrix.

6. The system as claimed in claim 1, wherein the calculated inverse matrix comprises a Moore-Penrose inverse matrix.

7. The system as claimed in claim 1, further comprising logic configured to sample the received signal using a sliding window.

8. The system as claimed in claim 1, further comprising logic configured to generate the impulse signal from a non-repeating code.

9. The system as claimed in claim 1, further comprising logic configured to generate the impulse signal from a code having at least some respective portions linearly independent of one another.

10. The system as claimed in claim 1, wherein the impulse signal comprises substantially white noise.

11. The system as claimed in claim 1, further comprising logic configured to generate the impulse signal with a bandwidth which is a fraction of the bandwidth of the transmitter and receiver subsystem.

12. The system as claimed in claim 1, further comprising logic configured to select a subset of rows and/or columns of the inverse matrix to calculate.

13. The system as claimed in claim 12 comprising logic configured to interpolate between the subset of rows and/or columns in the calculated inverse matrix.

14. The system as claimed in claim 1, further comprising logic configured to decompose the calculated inverse matrix into a pair of matrices derived from a subset of a singular value decomposition of the impulse signal matrix.

15. The system as claimed in claim 14, further comprising logic configured to select a subset of samples of the received signal to produce a subset vector and multiplying the pair of matrices by the subset vector.

16. The system as claimed in claim 1, further comprising logic configured to construct a position diagram based on an estimated channel response resulting from applying the calculated inverse matrix of the impulse signal to the return signal.

17. The system as claimed in claim 1, further comprising a plurality of transmitters configured to be driven by respective signals from the same frequency band; the receiver being configured to separate the respective received signals.

18. The system as claimed in claim 1, further comprising logic configured to combine a plurality of estimated channel responses using ellipse or ellipsoid intersection.

19. The system as claimed in claim 1, further comprising logic configured to sample the impulse signal and the received response signal at the same rate.

20. A non-transitory computer readable medium comprising instructions, which, when executed, cause a computer to perform the method of claim 1.

21. A non-transitory computer readable medium comprising instructions, which, when executed, cause a computer to operate a human-machine interface which tracks movement of an object in air wherein said human-machine interface comprises: an acoustic transmitter; an acoustic receiver; said instructions including logic configured to apply a calculated inverse matrix of an impulse signal transmitted by the acoustic transmitter to a signal received by the acoustic receiver, wherein movement of the object is used to control the machine.

* * * * *